United States Patent
Sonoda et al.

(10) Patent No.: US 11,078,587 B2
(45) Date of Patent: Aug. 3, 2021

(54) TIN-PLATED PRODUCT AND METHOD FOR PRODUCING SAME

(71) Applicants: Dowa Metaltech Co., Ltd., Tokyo (JP); Yazaki Corporation, Tokyo (JP)

(72) Inventors: Yuta Sonoda, Tokyo (JP); Hiroto Narieda, Tokyo (JP); Hideki Endo, Tokyo (JP); Akira Sugawara, Tokyo (JP); Hirotaka Kotani, Tokyo (JP); Jyun Toyoizumi, Shizuoka (JP); Takaya Kondo, Shizuoka (JP); Yuya Kishibata, Shizuoka (JP)

(73) Assignees: Dowa Metaltech Co., Ltd., Tokyo (JP); Yazaki Corporation, Tokyo (JP)

( * ) Notice: Subject to any disclaimer, the term of this patent is extended or adjusted under 35 U.S.C. 154(b) by 272 days.

(21) Appl. No.: 15/752,996

(22) PCT Filed: Aug. 23, 2016

(86) PCT No.: PCT/JP2016/003830
§ 371 (c)(1),
(2) Date: Feb. 15, 2018

(87) PCT Pub. No.: WO2017/038048
PCT Pub. Date: Mar. 9, 2017

(65) Prior Publication Data
US 2018/0245230 A1 Aug. 30, 2018

(30) Foreign Application Priority Data
Sep. 1, 2015 (JP) .............................. JP2015-172063

(51) Int. Cl.
*B32B 15/01* (2006.01)
*C25D 5/12* (2006.01)
(Continued)

(52) U.S. Cl.
CPC ................ *C25D 5/12* (2013.01); *B32B 15/01* (2013.01); *C25D 5/50* (2013.01); *C25D 5/505* (2013.01);
(Continued)

(58) Field of Classification Search
None
See application file for complete search history.

(56) References Cited

U.S. PATENT DOCUMENTS 7,824,776 B2 * 11/2010 Yoshida ................... C25D 5/12
428/647

FOREIGN PATENT DOCUMENTS

JP       2003293187 A    10/2003
JP       2006183068 A     7/2006
(Continued)

OTHER PUBLICATIONS

International search report for Application No. PCT/JP2016/003830 dated Sep. 13, 2016.

*Primary Examiner* — Daniel J. Schleis
(74) *Attorney, Agent, or Firm* — Bachman and Lapointe PC; George Coury (57) ABSTRACT

A tin-plated product contains: a substrate 10 of copper or a copper alloy; an underlying layer 12 of nickel which is formed on the surface of the substrate 10; and an outermost layer 14 containing tin, the outermost layer 14 being formed on the surface of the underlying layer 12, the outermost layer 14 being composed of a copper-tin alloy layer 14a of a large number of crystal grains of a copper-tin alloy, tin layers 14b of tin having an average thickness of 0.01 to 0.20 micrometers, and a plurality of copper-nickel-tin alloy layers 14c of a copper-nickel-tin alloy, each of the tin layers 14b being formed in a corresponding one of recessed portions between adjacent two of the crystal grains of the copper-tin alloy on the outermost surface of the copper-tin alloy layer, the copper-nickel-tin alloy layers 14c being arranged on the side of the underlying layer 12 in the copper-tin alloy layer 14a so as to be apart from each other.

10 Claims, 1 Drawing Sheet (51) Int. Cl.
  *H01R 13/03* (2006.01)
  *C25D 5/50* (2006.01)
  *H01R 43/16* (2006.01)
  *C25D 3/32* (2006.01)
  *C25D 3/38* (2006.01)
  *C25D 3/12* (2006.01)
(52) U.S. Cl.
  CPC .......... *H01R 13/03* (2013.01); *B32B 2311/12* (2013.01); *B32B 2311/16* (2013.01); *B32B 2311/22* (2013.01); *C25D 3/12* (2013.01); *C25D 3/32* (2013.01); *C25D 3/38* (2013.01); *H01R 43/16* (2013.01)

(56) References Cited

FOREIGN PATENT DOCUMENTS

| | | | |
|---|---|---|---|
| JP | 2007247060 A | | 9/2007 |
| JP | 2013185193 A | | 9/2013 |
| JP | 2013231223 | * | 11/2013 |
| JP | 2013231223 A | | 11/2013 |
| JP | 2014240520 A | | 12/2014 |
| JP | 2015149200 A | | 8/2015 |
| WO | 2015133499 A1 | | 9/2015 |

* cited by examiner

TIN-PLATED PRODUCT AND METHOD FOR PRODUCING SAME

TECHNICAL FIELD

The present invention relates generally to a tin-plated product and a method for producing the same. More specifically, the invention relates to a tin-plated product used as the material of an insertable connecting terminal or the like, and a method for producing the same.

BACKGROUND ART

As conventional materials of insertable connecting terminals, there are used tin-plated products wherein a tin coating layer is formed as the outermost layer of a conductive material, such as copper or a copper alloy. In particular, tin-plated products are used as the materials of information communication equipment for automotive vehicles, portable telephones and personal computers, control substrates for industrial equipment, such as robots, terminals, such as connectors, lead frames, relays and switches, and bus bars, from the points of view of their small contact resistance, contact reliability, corrosion resistance, solderability, economy and so forth.

As such a tin-plated product, there is proposed a plated copper or copper alloy wherein a nickel or nickel alloy layer is formed on the surface of copper or a copper alloy, and a tin or tin alloy layer is formed on the outermost surface side thereof, at least one layer of intermediate layers containing copper and tin as main components or intermediate layers containing copper, nickel and tin as main components being formed between the nickel or nickel alloy layer and the tin or tin alloy layer, and at least one intermediate layer of these intermediate layers containing a layer which contains 50% by weight or less of copper and 20% by weight or less of nickel (see, e.g., Patent Document 1).

There is also proposed a conductive material for connecting parts, wherein a copper-tin alloy coating layer, which contains 20 to 70% by atom of copper and which has an average thickness of 0.2 to 3.0 micrometers, and a tin coating layer, which has an average thickness of 0.2 to 5.0 micrometers, are formed on the surface of a base material of a copper plate or bar in this order, and the surface thereof is reflow-treated, the arithmetic mean roughness Ra in at least one direction being 0.15 micrometer or more, the arithmetic mean roughness Ra in all directions being 3.0 micrometers or less, a part of the copper-tin alloy coating layer being exposed to the surface of the tin coating layer, and the exposed area ratio of the copper-tin alloy coating layer being 3 to 75% with respect to the surface of the conductive material (see, e.g., Patent Document 2).

PRIOR ART DOCUMENT(S)

Patent Document(s)

Patent Document 1: Japanese Patent Laid-Open No. 2003-293187 (Paragraph Numbers 0016)
Patent Document 2: Japanese Patent Laid-Open No. 2006-183068 (Paragraph Number 0014)

SUMMARY OF THE INVENTION

Problem to be Solved by the Invention

However, in the tin-plated product proposed in Patent Document 1, there is a problem in that the insertion force of an insertable connecting terminal or the like is increased during the insertion thereof if the tin-plated product is used as the material of the insertable connecting terminal or the like, although the tin-plated product has good solderability, whisker resistance, heat-resisting reliability and molding workability. In the tin-plated product proposed in Patent Document 2, the producing costs thereof are increased since a substrate is plated after the surface thereof is roughened in order to decrease the insertion force of an insertable connecting terminal or the like when the tin-plated product is used as the material of the insertable connecting terminal or the like.

It is therefore an object of the present invention to eliminate the aforementioned problems and to provide a tin-plated product which has a low insertion force when it is used as the material of an electric element, such as an insertable connecting terminal, and a method for producing the tin-plated product at low costs.

Means for Solving the Problem

In order to accomplish the aforementioned object, the inventors have diligently studied and found that it is possible to produce a tin-plated product at low costs, the tin-plated product having a low insertion force when it is used as the material of an electric element, such as an insertable connecting terminal, if the tin-plated product comprises: a substrate of copper or a copper alloy; an underlying layer of nickel or a copper-nickel alloy which is formed on a surface of the substrate; and an outermost layer containing tin, the outermost layer being formed on a surface of the underlying layer, wherein the outermost layer is composed of a copper-tin alloy layer of a copper-tin alloy, tin layers of tin, and copper-nickel-tin alloy layers of a copper-nickel-tin alloy, each of the tin layers being formed in a corresponding one of recessed portions on an outermost surface of the copper-tin alloy layer, the copper-nickel-tin alloy layers being arranged on the side of the underlying layer in the copper-tin alloy layer, the tin layers having an average thickness of 0.01 to 0.20 micrometers. Thus, the inventors have made the present invention.

According to the present invention, there is provided a tin-plated product comprising: a substrate of copper or a copper alloy; an underlying layer of nickel or a copper-nickel alloy which is formed on a surface of the substrate; and an outermost layer containing tin, the outermost layer being formed on a surface of the underlying layer, wherein the outermost layer is composed of a copper-tin alloy layer of a copper-tin alloy, tin layers of tin, and copper-nickel-tin alloy layers of a copper-nickel-tin alloy, each of the tin layers being formed in a corresponding one of recessed portions on an outermost surface of the copper-tin alloy layer, the copper-nickel-tin alloy layers being arranged on the side of the underlying layer in the copper-tin alloy layer, the tin layers having an average thickness of 0.01 to 0.20 micrometers.

In this tin-plated product, the copper-tin alloy layer is preferably formed of crystal grains of the copper-tin alloy, and each of the recessed portions is preferably formed between adjacent two of the crystal grains of the copper-tin alloy on the outermost surface. The copper-nickel-tin alloy layers are preferably composed of a plurality of layers which are arranged so as to be apart from each other. The area ratio occupied by the tin layers on the outermost surface of the tin-plated product is preferably 10 to 80%. The tin layers preferably have a maximum thickness of 1.5 micrometers or less. The copper-tin alloy layer preferably has an average thickness of 0.5 to 1.5 micrometers. The underlying layer preferably has an average thickness of 0.05 to 0.5 micrometers. The outermost surface preferably has an arithmetic mean waviness Wa of 0.06 micrometers or less in such a state that the tin layers are removed.

According to the present invention, there is provided a method for producing a tin-plated product, the method comprising the steps of: treating a surface of a substrate of copper or a copper alloy; forming a nickel plating layer having a thickness of not less than 0.05 micrometers, a copper plating layer having a thickness of not less than 0.05 micrometers, and a tin plating layer having a thickness of 0.2 to 0.9 micrometers, on the treated surface of the substrate in this order; and thereafter, carrying out a heat treatment to form an outermost layer being composed of a copper-tin alloy layer of a copper-tin alloy, tin layers of tin, and copper-nickel-tin layers of a copper-nickel-tin alloy, each of the tin layers being formed in a corresponding one of recessed portions on an outermost surface of the copper-tin alloy layer, and the copper-nickel-tin alloy layers being arranged on the side of an underlying layer in the copper-tin alloy layer.

In this method for producing a tin-plated product, the treatment of the surface of the substrate preferably causes the surface of the substrate to have an arithmetic mean roughness Ra of 0.05 to 0.1 micrometers, a maximum height Rz of 0.4 to 1.0 micrometers and an arithmetic mean waviness Wa of 0.05 micrometers or less. The ratio of the thickness of the tin plating layer to the thickness of the copper plating layer is preferably 1.2 to 3.5, and the ratio of the thickness of the tin plating layer to the sum of the thickness of the copper plating layer and the thickness of the nickel plating layer is preferably 0.5 to 3.0. The heat treatment is preferably a heat treatment for holding in a temperature range of 500 to 800° C. for 20 seconds or less, the heat treatment being preferably carried out by setting temperature and time so as to form the outermost layer composed of the copper-tin alloy layer of the copper-tin alloy, the tin layers of tin formed in the corresponding one of the recessed portions on the outermost surface of the copper-tin alloy layer, and the copper-nickel-tin alloy layers of the copper-nickel-tin alloy arranged on the side of the underlying layer in the copper-tin alloy layer.

According to the present invention, there is provided an electrical element which uses the above-described tin-plated product as a material thereof.

Effects of the Invention

According to the present invention, it is possible to produce a tin-plated product at low costs, the tin-plated product having a low insertion force when it is used as the material of an electric element, such as an insertable connecting terminal.

MODE FOR CARRYING OUT THE INVENTION

Figure 1:
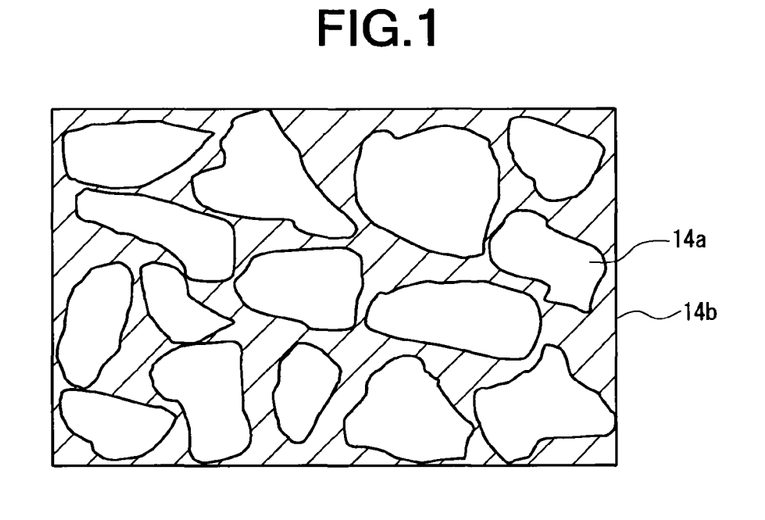
FIG. 1 is a plan view schematically showing the preferred embodiment of a tin-plated product according to the present invention.
Figure 2:
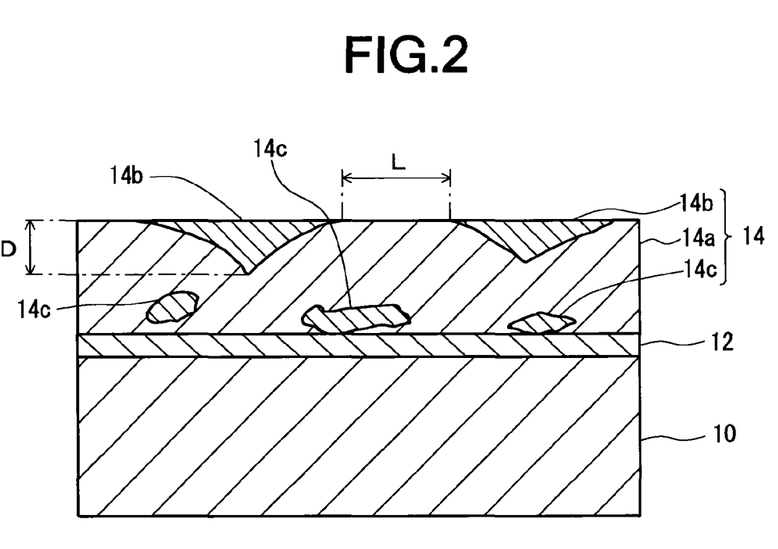
FIG. 2 is a sectional view schematically showing the tin-plated product of FIG. 1.

As shown in FIGS. 1 and 2, the preferred embodiment of a tin-plated product according to the present invention, comprises: a substrate 10 of copper or a copper alloy; an underlying layer 12 of nickel or a copper-nickel alloy which is formed on the surface of the substrate 10; and an outermost layer 14 containing tin, the outermost layer 14 being formed on the surface of the underlying layer 12, the outermost layer 14 being composed of a copper-tin alloy layer 14a of a large number of crystal grains of a copper-tin alloy, tin layers 14b of tin, and a plurality of copper-nickel-tin alloy layers 14c of a copper-nickel-tin alloy, each of the tin layers 14b being formed in a corresponding one of recessed portions between adjacent two of the crystal grains of the copper-tin alloy on the outermost surface of the copper-tin alloy layer 14a, the copper-nickel-tin alloy layers 14c being arranged on the side of the underlying layer 12 in the copper-tin alloy layer 14a so as to be apart from each other. Preferably, a layer of copper does not exist as an intermediate layer between the underlying layer 12 and the outermost layer 14.

In this tin-plated product, the copper-tin alloy preferably contains 20 to 50% by atom of tin and the balance being copper. The copper-tin alloy may contain $Cu_6Sn_5$ and/or $Cu_3Sn$. The copper-nickel-tin alloy preferably contains 20 to 30% by atom of tin and the balance being copper and nickel. The content of nickel in the copper-nickel-tin alloy is more preferably 5 to 25% by atom. The copper-nickel-tin alloy may contain $(Cu,Ni)_3Sn$ wherein part of Cu in $Cu_3Sn$ is replaced with Ni.

Each of the tin layers 14b is a layer containing 90% by atom or more of tin (preferably containing 95% by atom or more of tin), and may contain 10% by atom or less of copper (preferably 5% by atom or less of copper). The average thickness of the tin layers 14b is 0.01 to 0.20 micrometers, preferably 0.02 to 0.15 micrometers, and more preferably 0.03 to 0.10 micrometers. The maximum thickness of the tin layers 14b is preferably 1.5 micrometers or less, and more preferably 0.05 to 1.2 micrometers. The area ratio occupied by the tin layers 14b on the outermost surface of the tin-plated product is preferably 10 to 80%, and more preferably 10 to 60%.

The average thickness of the copper-tin alloy layer 14a is preferably 0.5 to 1.5 micrometers, and more preferably 0.7 to 1.3 micrometers.

The average thickness of the underlying layer 12 is preferably 0.05 to 0.5 micrometers, and more preferably 0.05 to 0.3 micrometers.

The average distance (the average value of lengths of each part of the copper-tin alloy layer 14a along the outermost surface on a cross-section perpendicular to the rolling direction of the tin-plated product) between the recessed portions on the outermost surface (between adjacent two of the tin layers 14b) on the cross-section of the tin-plated product is preferably 0.1 to 3.0 micrometers, and more preferably 1.0 to 2.5 micrometers. The ratio (a/b) of the maximum depth (a) of the recessed portions (the maximum thickness of the tin layers 14b) to the average distance (b) between the recessed portions on the outermost surface is preferably 0.1 to 1.5, and more preferably 0.2 to 1.0. In such a state that the tin layers 14 are removed, the arithmetic mean waviness Wa of the outermost surface of the copper-tin alloy layer 14a is preferably 0.06 micrometers or less, and more preferably 0.005 to 0.05 micrometers. It is considered that it is possible to decrease the insertion force by decreasing the resistance due to sliding when the tin-plated product is used as the material of an electric element, such as an insertable connecting terminal, if the arithmetic mean waviness Wa of the outermost surface of the copper-tin alloy layer 14a is smaller in such a state that the tin layers 14 are removed.

In the preferred embodiment of a method for producing a tin-plated product according to the present invention, after the surface of a substrate of copper or a copper alloy is treated, a nickel plating layer having a thickness of not less than 0.05 micrometers, a copper plating layer having a thickness of not less than 0.05 micrometers, and a tin plating layer having a thickness of 0.2 to 0.9 micrometers are formed on the surface of the substrate in this order, and thereafter, a heat treatment is carried out to form an outermost layer 14 being composed of a copper-tin alloy layer 14a of a copper-tin alloy, tin layers 14b of tin, and copper-nickel-tin layers 14c of a copper-nickel-tin alloy, each of the tin layers 14b being formed in a corresponding one of recessed portions on an outermost surface of the copper-tin alloy layer 14a, and the copper-nickel-tin alloy layers 14c being arranged on the side of an underlying layer 12 in the copper-tin alloy layer 14a.

In this method for producing a tin-plated product, the treatment of the surface of the substrate preferably causes the surface of the substrate to have an arithmetic mean roughness Ra of 0.05 to 0.1 micrometers, a maximum height Rz of 0.4 to 1.0 micrometers and an arithmetic mean waviness Wa of 0.05 micrometers or less. As a method for treating the surface of the substrate in order to thus decrease the surface roughness of the substrate (to a predetermined value) to decrease the convexo-concave irregularities of the surface of the substrate, there can be utilized any one of various methods, e.g., chemical polishing such as electrolytic polishing, rolling using work rolls, the surface roughness of the work rolls being decreased by polishing or the like, mechanical polishing such as buffing or blasting, and so forth.

The thickness of the nickel plating layer is 0.05 micrometers or more, preferably 0.07 to 0.3 micrometers, more preferably 0.07 to 0.2 micrometers, and most preferably 0.07 to 0.15 micrometers. The thickness of the copper plating layer is 0.05 micrometers or more, preferably 0.2 to 0.5 micrometers, and more preferably 0.2 to 0.4 micrometers. The thickness of the tin plating layer is 0.2 to 0.9 micrometers, preferably 0.25 to 0.8 micrometers, and more preferably 0.3 to 0.8 micrometers. The ratio (Sn/Cu) of the thickness of the tin plating layer to the thickness of the copper plating layer is preferably 1.2 to 3.5 (more preferably 1.3 to 2.0), and the ratio (Sn/(Cu+Ni)) of the thickness of the tin plating layer to the sum of the thickness of the copper plating layer and the thickness of the nickel plating layer is preferably 0.5 to 3.0 (more preferably 0.7 to 2.0).

The heat treatment is preferably a heat treatment for holding in a temperature range of 500 to 800° C. for 20 seconds or less in the atmosphere. The heat treatment is preferably carried out by setting temperature and time so as to form the outermost layer 14 composed of the copper-tin alloy layer 14a of the copper-tin alloy, the tin layers 14b of tin formed in the corresponding one of the recessed portions on the outermost surface of the copper-tin alloy layer 14a, and the copper-nickel-tin alloy layers 14c of the copper-nickel-tin alloy arranged on the side of the underlying layer 12 in the copper-tin alloy layer 14a.

EXAMPLES

Examples of a tin-plated product and a method for producing the same according to the present invention will be described below in detail.

Example 1

First, there was prepared a conductive substrate plate of a Cu—Ni—Sn—P alloy (a substrate of a copper alloy comprising 1.0% by weight of nickel, 0.9% by weight of tin, 0.05% by weight of phosphorus and the balance being copper) having a thickness of 0.2 mm. Then, the surface of the substrate was rolled to be treated by a rolling mill roll (a rolling mill roll polished to decrease the arithmetic mean roughness Ra of the surface thereof) to decrease the surface roughness of the substrate. With respect to the surface roughness of the substrate thus surface-treated, the arithmetic mean roughness Ra and maximum height Rz, which were parameters exhibiting the surface roughness, and the arithmetic mean waviness Wa were calculated on the basis of JIS B0601 (2001) from the results measured in directions perpendicular to the rolling direction on the rolling surface by means of a contact surface roughness measuring apparatus (Surfcoder SE4000 produced by Kosaka Laboratory Ltd.). As a result, the arithmetic mean roughness Ra was 0.06 micrometers, the maximum height Rz was 0.5 micrometers, and the arithmetic mean waviness Wa was 0.03 micrometers.

Then, as a pretreatment, the substrate (a material to be plated) thus surface-treated was electrolytic-degreased for 10 seconds with an alkali electrolytic-degreasing solution, and then, washed with water. Thereafter, the substrate was immersed in 5% by weight of sulfuric acid for 10 seconds to be pickled, and then, washed with water.

Then, the substrate (the material to be plated) thus surface-treated and a nickel electrode plate were used as a cathode and an anode, respectively, to electroplate the substrate at a current density of 8 A/dm$^2$ and a liquid temperature of 50° C. for 5 seconds in a nickel plating solution containing 80 g/L of nickel sulfamate and 45 g/L of boric acid to form a nickel plating layer having a thickness of 0.08 micrometers on the substrate.

Then, the substrate thus nickel-plated and a copper electrode plate were used as a cathode and an anode, respectively, to electroplate the substrate at a current density of 8 A/dm$^2$ and a liquid temperature of 20° C. for 15 seconds in a copper plating solution containing 110 g/L of copper sulfate and 100 g/L of sulfuric acid to form a copper plating layer having a thickness of 0.28 micrometers on the substrate.

Then, the substrate thus copper-plated and a tin electrode plate were used as a cathode and an anode, respectively, to electroplate the substrate at a current density of 7 A/dm$^2$ and a liquid temperature of 20° C. for 10 seconds in a tin plating solution containing 60 g/L of tin sulfate, 75 g/L of sulfuric acid, 30 g/L of cresol sulfonic acid and 1 g/L of β-naphthol to form a tin plating layer having a thickness of 0.45 micrometers on the substrate.

In the plated product after being plated with tin, the ratio of the thickness of the tin plating layer to the thickness of the copper plating layer was 1.6, and the ratio of the thickness of the tin plating layer to the sum of the thickness of the copper plating layer and the thickness of the nickel plating layer was 1.3.

Then, the plated product after being plated with tin was washed and dried, and then, put in a bright annealing furnace (produced by Koyo Lindberg Co., Ltd.) in which the plated product was held at an internal temperature of furnace of 700° C. for 5 seconds in the atmosphere to be heat-treated.

The tin-plated product thus produced was cut by a focused ion beam (FIB) instrument to expose a cross-section perpendicular to the rolling direction of the tin-plated product. Then, the cross-section was analyzed by Auger electron spectroscopy (AES). As a result, it was confirmed that the outermost layer formed on the outermost surface side of the tin-plated product was composed of tin, a copper-tin alloy and a copper-nickel-tin alloy and that recessed portions were formed (between adjacent two of crystal grains of the copper-tin alloy) on the surface of the copper-tin alloy layer formed of the crystal grains of the copper-tin alloy, each of the recessed portions having a tin layer therein to allow the copper-tin alloy layer and the tin layers to exist on the outermost surface, and a plurality of copper-nickel-tin alloy layers of the copper-nickel-tin alloy existing so as to be apart from each other on the underlying side (on the side of an underlying layer) in the copper-tin alloy layer. Furthermore, it was confirmed that the copper-tin alloy layer was composed of the crystal grains of the copper-tin alloy after dissolving the tin layers of the outermost layer of the tin-plated product with chemicals such as an electrolyte solution capable of dissolving tin (S-110 produced by Chuo Seisakusho Ltd.). It was also confirmed by electron probe microanalysis (EPMA) that each of the tin layers of tin was formed in a corresponding one of the recessed portions formed between adjacent two of crystal grains of the copper-tin alloy on the surface of the copper-in alloy layer.

The thicknesses of these layers were measured by an electrolytic film thickness meter (Thickness Tester TH-11 produced by Chuo Seisakusho Ltd.) using an electrolyte solution (S-110 produced by Chuo Seisakusho Ltd.). As a result, the average thickness of the tin layers was 0.04 micrometers, and the average thickness of the copper-tin alloy layer was 0.87 micrometers. The arithmetic mean waviness Wa was calculated after the tin layers were removed. As a result, the arithmetic mean waviness Wa was 0.05 micrometers. Furthermore, the aforementioned electrolyte solution causes the tin layers to be dissolved therein at about 0.2 V and causes the copper-tin alloy layer to be dissolved therein at 0.4 to 0.6 V, so that the thickness of the tin layers and the thickness of the copper-tin alloy layer can be measured, respectively.

The outermost layer of the tin-plated product was etched with argon ions to carry out the elemental analysis of the tin-plated product by AES. As a result, the underlying layer formed on the surface of the substrate of the tin-plated product was composed of a layer of a copper-nickel alloy. The presence of an intermediate layer between the outermost layer and underlying layer of the tin-plated product was analyzed by AES. As a result, no copper layer existed as the intermediate layer, so that the outermost layer was formed on the surface of the underlying layer. After the outermost layer and the intermediate layer were removed with chemicals, the average thickness of the underlying layer was measured by an X-ray fluorescent analysis thickness meter (SFT3300 produced by Seiko Instruments Inc.) (assuming that the underlying layer was a layer of nickel). As a result, the average thickness of the underlying layer was 0.06 micrometers.

After gold was deposited on the outermost surface of the tin-plated product so as to have a thickness of about 200 nanometers, the tin-plated product was cut by a focused ion beam (FIB) instrument to expose a cross-section perpendicular to the rolling direction of the tin-plated product. Then, ten points on the exposed cross-section were observed at a magnification of 5,000 in a visual field having a length L (=20 micrometers) parallel to the surface of the tin-plated product by means of a scanning electron microscope (SEM). In each of the observed regions, the total (Lm) of lengths of the copper-tin alloy layer contacting the evaporated gold layer was subtracted from the length L (=20 micrometers) of the whole region to be divided by the length L of the whole region to obtain a value (a ratio (=(L-Lm)/L) of the length of the tin layer contacting the evaporated gold layer in the observed region), and then, an average value of the values (the ratio (L-Lm)/L) obtained in eight observed regions, except for the maximum and minimum values in the ten observed regions, was multiplied by 100 to calculate a value as the area ratio of tin (the area occupied by the tin layer on the outermost surface). As a result, the area ratio of tin was 20.8%.

Then, the tin-plated product was cut by a focused ion beam (FIB) instrument to expose a cross-section perpendicular to the rolling direction of the tin-plated product. Then, three points on the cross-section were observed at a magnification of 5,000 in a visual field having a length of about 30 micrometers parallel to the surface of the tin-plated product by means of a scanning electron microscope (SEM) to obtain the maximum depth (the depth by D in FIG. 2) of the recessed portions on the outermost surface (the maximum thickness of the tin layers (the depth at which pure tin existed)). As a result, the maximum depth in the recessed portions was 0.38 micrometers. The average distance between the recessed portions (between adjacent two of the tin layers) (the average value of distances between the tin layers shown by L in FIG. 2) on the outermost surface (on the cross-section perpendicular to the rolling direction of the tin-plated product) was calculated from the number of the recessed portions formed on the outermost surface. As a result, the average distance between the recessed portions was 1.35 micrometers. Furthermore, the ratio (a/b) of the maximum depth (a) of the recessed portions (the maximum thickness of the tin layers) to the average distance (b) between the recessed portions on the outermost surface was calculated to be 0.28.

Then, a plate test piece cut off from the obtained tin-plated product was indented (R=1.5 mm) by a press machine on the table to be prepared as a female terminal, and a plate test piece cut off from a heat-treated (reflowed) tin-plated product (a tin-plated product having a tin layer having a thickness of 0.67 micrometers as the outermost layer, the area ratio occupied by the tin layer on the outermost surface being 100%, and the tin-plated product having a copper-tin alloy layer having a thickness of 1.15 micrometers between the outermost layer and a conductive substrate plate) was prepared as a male terminal, the heat-treated tin-plated product being obtained by causing a tin plating layer having a thickness of 3.0 micrometers to be formed on the conductive substrate plate of a Cu—Ni—Sn—P alloy (a substrate of a copper alloy containing 1.0% by weight of nickel, 0.9% by weight of tin, 0.05% by weight of phosphorus and the balance being copper, and having an arithmetic mean roughness Ra of 0.15 micrometers, a maximum height Rz of 1.65 micrometers and an arithmetic mean waviness Wa of 0.08 micrometers) having a thickness of 0.2 mm to be held at 650° C. for 4.3 seconds. After the indented female terminal was caused to contact the plate male terminal fixed on a horizontal table of a horizontal load measuring apparatus (an apparatus produced by combining an electric contact simulator produced by Yamazaki Seiki Co., Ltd., a stage controller, a load cell and a load cell amplifier), the female terminal was horizontally pulled at a sliding speed of 80 mm/min by a sliding distance of 10 mm while the female terminal was pressed against the surface of the male terminal at a load of 2 N, 5 N and 8 N, respectively. Then, forces applied in the horizontal direction from 1 mm to 4 mm (measuring distance of 3 mm) were measured to calculate an average value F thereof, and the coefficient ($\mu$) of dynamic friction between the test pieces was calculated from $\mu$=F/N.

As a result, the coefficient of dynamic friction was 0.33, 0.26 and 0.18 when the load was 2 N, 5 N and 8 N, respectively.

Example 2

A tin-plated product was produced by the same method as that in Example 1, except that the thickness of the nickel plating layer was 0.09 micrometers, the thickness of the copper plating layer was 0.31 micrometers, and the thickness of the tin plating layer was 0.57 micrometers. Furthermore, in the plated product after being plated with tin (the tin-plated product before the heat treatment), the ratio of the thickness of the tin plating layer to the thickness of the copper plating layer was 1.8, and the ratio of the thickness of the tin plating layer to the sum of the thickness of the copper plating layer and the thickness of the nickel plating layer was 1.4.

With respect to the tin-plated product thus produced, the analysis of the plating layers, the calculation of the area (area ratio of tin) occupied by the tin layers on the outermost surface, the derivation of the maximum depth of the recessed portions (the maximum thickness of the tin layers), the calculation of the average distance between the recessed portions, and the calculation of the coefficient of friction were carried out by the same methods as those in Example 1.

As a result, it was confirmed that the outermost layer was composed of tin, a copper-tin alloy and a copper-nickel-tin alloy and that recessed portions were formed (between adjacent two of crystal grains of the copper-tin alloy) on the surface of the copper-tin alloy layer formed of the crystal grains of the copper-tin alloy, each of the recessed portions having a tin layer therein to allow the copper-tin alloy layer and the tin layers to exist on the outermost surface, and a plurality of copper-nickel-tin alloy layers of the copper-nickel-tin alloy existing so as to be apart from each other on the underlying side (on the side of an underlying layer) in the copper-tin alloy layer. The average thickness of the tin layers was 0.07 micrometers, and the average thickness of the copper-tin alloy layer was 0.85 micrometers. The underlying layer was formed of nickel, and no copper layer existed as the intermediate layer, so that the outermost layer was formed on the surface of the underlying layer. The average thickness of the underlying layer was 0.07 micrometers. The arithmetic mean waviness Wa was 0.05 micrometers after the tin layers were removed.

The area occupied by the tin layers on the outermost surface (the area ratio of tin) was 18.0%, the maximum depth in the recessed portions (the maximum thickness of the tin layers) was 0.51 micrometers, and the average distance between the recessed portions on the outermost surface was 2.10 micrometers. Furthermore, the ratio (a/b) of the maximum depth (a) of the recessed portions (the maximum thickness of the tin layers) to the average distance (b) between the recessed portions on the outermost surface was calculated to be 0.24.

The coefficient of dynamic friction was 0.28, 0.22 and 0.15 when the load was 2 N, 5 N and 8 N, respectively.

Example 3

A tin-plated product was produced by the same method as that in Example 1, except that the thickness of the nickel plating layer was 0.09 micrometers, the thickness of the copper plating layer was 0.45 micrometers, and the thickness of the tin plating layer was 0.70 micrometers, and that the holding time in the heat treatment was 4.7 seconds. Furthermore, in the plated product after being plated with tin (the tin-plated product before the heat treatment), the ratio of the thickness of the tin plating layer to the thickness of the copper plating layer was 1.6, and the ratio of the thickness of the tin plating layer to the sum of the thickness of the copper plating layer and the thickness of the nickel plating layer was 1.3.

With respect to the tin-plated product thus produced, the analysis of the plating layers, the calculation of the area (area ratio of tin) occupied by the tin layers on the outermost surface, the derivation of the maximum depth of the recessed portions (the maximum thickness of the tin layers), the calculation of the average distance between the recessed portions, and the calculation of the coefficient of friction were carried out by the same methods as those in Example 1.

As a result, it was confirmed that the outermost layer was composed of tin, a copper-tin alloy and a copper-nickel-tin alloy and that recessed portions were formed (between adjacent two of crystal grains of the copper-tin alloy) on the surface of the copper-tin alloy layer formed of the crystal grains of the copper-tin alloy, each of the recessed portions having a tin layer therein to allow the copper-tin alloy layer and the tin layers to exist on the outermost surface, and a plurality of copper-nickel-tin alloy layers of the copper-nickel-tin alloy existing so as to be apart from each other on the underlying side (on the side of an underlying layer) in the copper-tin alloy layer. The average thickness of the tin layers was 0.07 micrometers, and the average thickness of the copper-tin alloy layer was 1.26 micrometers. The underlying layer was formed of nickel, and no copper layer existed as the intermediate layer, so that the outermost layer was formed on the surface of the underlying layer. The average thickness of the underlying layer was 0.05 micrometers. The arithmetic mean waviness Wa was 0.03 micrometers after the tin layers were removed.

The area occupied by the tin layers on the outermost surface (the area ratio of tin) was 42.9%, the maximum depth in the recessed portions (the maximum thickness of the tin layers) was 1.00 micrometers, and the average distance between the recessed portions on the outermost surface was 1.33 micrometers. Furthermore, the ratio (a/b) of the maximum depth (a) of the recessed portions (the maximum thickness of the tin layers) to the average distance (b) between the recessed portions on the outermost surface was calculated to be 0.75.

The coefficient of dynamic friction was 0.33, 0.25 and 0.18 when the load was 2 N, 5 N and 8 N, respectively.

The cross-section (perpendicular to the rolling direction) of the tin-plated product in this example was observed by a field emission Auger electron spectrometer (FE-AES). From the contrast in a scanning ion microscope (SIM) image of the cross-section, it was possible to definitely differentiate the copper-tin alloy layer, the tin layers and the copper-nickel-tin layers from each other. Then, each of these layers was irradiated with focused electron beam (two portions on the copper-tin alloy layer and two portions on the copper-nickel-tin alloy layers were irradiated therewith) to carry out the composition analysis thereof. As a result, each of the tin layers was a layer of 95.92% by atom of Sn and 4.08% by atom of Cu. One of the irradiated portions on the copper-tin alloy layer was a portion of 39.44% by atom of Sn and 60.56% by atom of Cu, and the other of the irradiated portions thereon was a portion of 27.01% by atom of Sn and 72.99% by atom of Cu. One of the irradiated portions on the copper-nickel-tin alloy layers was a portion of 27.17% by atom of Sn, 66.53% by atom of Cu and 6.30% by atom of Ni, and the other of the irradiated portions thereon was a portion of 26.23% by atom of Sn, 52.31% by atom of Cu and 21.45% by atom of Ni.

Example 4

A tin-plated product was produced by the same method as that in Example 1, except that the treated surface of the substrate had an arithmetic mean roughness Ra of 0.07 micrometers, a maximum height Rz of 0.53 micrometers and an arithmetic mean waviness Wa of 0.04 micrometers, that the thickness of the nickel plating layer was 0.11 micrometers, the thickness of the copper plating layer was 0.29 micrometers, and the thickness of the tin plating layer was 0.38 micrometers, and that the holding time in the heat treatment was 6.8 seconds. Furthermore, in the plated product after being plated with tin (the tin-plated product before the heat treatment), the ratio of the thickness of the tin plating layer to the thickness of the copper plating layer was 1.3, and the ratio of the thickness of the tin plating layer to the sum of the thickness of the copper plating layer and the thickness of the nickel plating layer was 1.0.

With respect to the tin-plated product thus produced, the analysis of the plating layers, the calculation of the area (area ratio of tin) occupied by the tin layers on the outermost surface, the derivation of the maximum depth of the recessed portions (the maximum thickness of the tin layers), the calculation of the average distance between the recessed portions, and the calculation of the coefficient of friction were carried out by the same methods as those in Example 1.

As a result, it was confirmed that the outermost layer was composed of tin, a copper-tin alloy and a copper-nickel-tin alloy and that recessed portions were formed (between adjacent two of crystal grains of the copper-tin alloy) on the surface of the copper-tin alloy layer formed of the crystal grains of the copper-tin alloy, each of the recessed portions having a tin layer therein to allow the copper-tin alloy layer and the tin layers to exist on the outermost surface, and a plurality of copper-nickel-tin alloy layers of the copper-nickel-tin alloy existing so as to be apart from each other on the underlying side (on the side of an underlying layer) in the copper-tin alloy layer. The average thickness of the tin layers was 0.04 micrometers, and the average thickness of the copper-tin alloy layer was 0.75 micrometers. The underlying layer was formed of nickel, and no copper layer existed as the intermediate layer, so that the outermost layer was formed on the surface of the underlying layer. The average thickness of the underlying layer was 0.07 micrometers. The arithmetic mean waviness Wa was 0.05 micrometers after the tin layers were removed.

The area occupied by the tin layers on the outermost surface (the area ratio of tin) was 16.3%, the maximum depth in the recessed portions (the maximum thickness of the tin layers) was 0.52 micrometers, and the average distance between the recessed portions on the outermost surface was 2.38 micrometers. Furthermore, the ratio (a/b) of the maximum depth (a) of the recessed portions (the maximum thickness of the tin layers) to the average distance (b) between the recessed portions on the outermost surface was calculated to be 0.22.

The coefficient of dynamic friction was 0.17, 0.13 and 0.10 when the load was 2 N, 5 N and 8 N, respectively.

Comparative Example 1

A tin-plated product was produced by the same method as that in Example 1, except that the treated surface of the substrate had an arithmetic mean roughness Ra of 0.15 micrometers, a maximum height Rz of 1.65 micrometers and an arithmetic mean waviness Wa of 0.08 micrometers, that nickel plating and copper plating were not carried out, that the thickness of the tin plating layer was 1.0 micrometers, and that the temperature in the heat treatment was 650° C. and the holding time therein was 4.3 seconds.

With respect to the tin-plated product thus produced, the analysis of the plating layers, the calculation of the area (area ratio of tin) occupied by the tin layers on the outermost surface, the derivation of the maximum depth of the recessed portions (the maximum thickness of the tin layers), the calculation of the average distance between the recessed portions, and the calculation of the coefficient of friction were carried out by the same methods as those in Example 1.

As a result, it was confirmed that the outermost layer was composed of tin and that the copper-nickel-tin alloy of the copper-nickel-tin alloy did not exist on the underlying side (on the side of an underlying layer in a tin layer). The average thickness of the tin layer was 0.67 micrometers. The underlying layer was formed of a copper-nickel alloy, and no copper layer existed as the intermediate layer between the underlying layer and the outermost layer, so that the outermost layer was formed on the surface of the underlying layer. The average thickness of the underlying layer was 1.15 micrometers. The arithmetic mean waviness Wa was 0.13 micrometers after the tin layer was removed.

The area occupied by the tin layer on the outermost surface (the area ratio of tin) was 100%. The coefficient of dynamic friction was 0.44, 0.35 and 0.23 when the load was 2 N, 5 N and 8 N, respectively.

Comparative Example 2

A tin-plated product was produced by the same method as that in Example 1, except that the thickness of the nickel plating layer was 0.09 micrometers, the thickness of the copper plating layer was 0.49 micrometers, and the thickness of the tin plating layer was 0.95 micrometers, and that the holding time in the heat treatment was 4.7 seconds. Furthermore, in the plated product after being plated with tin (the tin-plated product before the heat treatment), the ratio of the thickness of the tin plating layer to the thickness of the copper plating layer was 1.9, and the ratio of the thickness of the tin plating layer to the sum of the thickness of the copper plating layer and the thickness of the nickel plating layer was 1.6.

With respect to the tin-plated product thus produced, the analysis of the plating layers, the calculation of the area (area ratio of tin) occupied by the tin layers on the outermost surface, the derivation of the maximum depth of the recessed portions (the maximum thickness of the tin layers), the calculation of the average distance between the recessed portions, and the calculation of the coefficient of friction were carried out by the same methods as those in Example 1.

As a result, it was confirmed that the outermost layer was composed of tin, a copper-tin alloy and a copper-nickel-tin alloy and that recessed portions were formed (between adjacent two of crystal grains of the copper-tin alloy) on the surface of the copper-tin alloy layer formed of the crystal grains of the copper-tin alloy, each of the recessed portions having a tin layer therein to allow the copper-tin alloy layer and the tin layers to exist on the outermost surface, and a plurality of copper-nickel-tin alloy layers of the copper-nickel-tin alloy existing so as to be apart from each other on the underlying side (on the side of an underlying layer) in the copper-tin alloy layer. The average thickness of the tin layers was 0.23 micrometers, and the average thickness of the copper-tin alloy layer was 1.27 micrometers. The underlying layer was formed of nickel, and no copper layer existed as the intermediate layer, so that the outermost layer was formed on the surface of the underlying layer. The average thickness of the underlying layer was 0.06 micrometers. The arithmetic mean waviness Wa was 0.03 micrometers after the tin layers were removed.

The area occupied by the tin layers on the outermost surface (the area ratio of tin) was 73.8%, the maximum depth in the recessed portions (the maximum thickness of the tin layers) was 3.15 micrometers, and the average distance between the recessed portions on the outermost surface was 1.34 micrometers. Furthermore, the ratio (a/b) of the maximum depth (a) of the recessed portions (the maximum thickness of the tin layers) to the average distance (b) between the recessed portions on the outermost surface was calculated to be 2.35.

The coefficient of dynamic friction was 0.43, 0.30 and 0.20 when the load was 2 N, 5 N and 8 N, respectively.

Comparative Example 3

A tin-plated product was produced by the same method as that in Example 1, except that the treated surface of the substrate had an arithmetic mean roughness Ra of 0.09 micrometers, a maximum height Rz of 0.66 micrometers and an arithmetic mean waviness Wa of 0.08 micrometers, that the thickness of the nickel plating layer was 0.30 micrometers, the thickness of the copper plating layer was 0.30 micrometers, and the thickness of the tin plating layer was 0.70 micrometers, and that the temperature in the heat treatment was 650° C. and the holding time therein was 4.0 seconds. Furthermore, in the plated product after being plated with tin (the tin-plated product before the heat treatment), the ratio of the thickness of the tin plating layer to the thickness of the copper plating layer was 2.3, and the ratio of the thickness of the tin plating layer to the sum of the thickness of the copper plating layer and the thickness of the nickel plating layer was 1.2.

With respect to the tin-plated product thus produced, the analysis of the plating layers, the calculation of the area (area ratio of tin) occupied by the tin layers on the outermost surface, the derivation of the maximum depth of the recessed portions (the maximum thickness of the tin layers), the calculation of the average distance between the recessed portions, and the calculation of the coefficient of friction were carried out by the same methods as those in Example 1.

As a result, it was confirmed that the outermost layer was composed of tin and that a plurality of copper-tin alloy layers of a copper-tin alloy existed on the underlying side (on the side of an underlying layer) in a tin layer as an intermediate layer. The average thickness of the tin layer was 0.34 micrometers, and the average thickness of the copper-tin alloy layer was 0.77 micrometers. The underlying layer was formed of nickel, and no copper layer existed between the underlying layer and the intermediate layer, so that the outermost layer was formed on the surface of the underlying layer via the intermediate layer. The average thickness of the underlying layer was 0.30 micrometers. The arithmetic mean waviness Wa was 0.08 micrometers after the tin layer was removed.

The area occupied by the tin layer on the outermost surface (the area ratio of tin) was 100%. The coefficient of dynamic friction was 0.42, 0.32 and 0.22 when the load was 2 N, 5 N and 8 N, respectively.

Comparative Example 4

A tin-plated product was produced by the same method as that in Example 1, except that the treated surface of the substrate had an arithmetic mean roughness Ra of 0.13 micrometers, a maximum height Rz of 0.86 micrometers and an arithmetic mean waviness Wa of 0.08 micrometers, that the thickness of the nickel plating layer was 0.09 micrometers, the thickness of the copper plating layer was 0.29 micrometers, and the thickness of the tin plating layer was 0.56 micrometers, and that the holding time in the heat treatment was 6.0 seconds. Furthermore, in the plated product after being plated with tin (the tin-plated product before the heat treatment), the ratio of the thickness of the tin plating layer to the thickness of the copper plating layer was 1.9, and the ratio of the thickness of the tin plating layer to the sum of the thickness of the copper plating layer and the thickness of the nickel plating layer was 1.5.

With respect to the tin-plated product thus produced, the analysis of the plating layers, the calculation of the area (area ratio of tin) occupied by the tin layers on the outermost surface, the derivation of the maximum depth of the recessed portions (the maximum thickness of the tin layers), the calculation of the average distance between the recessed portions, and the calculation of the coefficient of friction were carried out by the same methods as those in Example 1.

As a result, it was confirmed that the outermost layer was composed of tin and a copper-tin alloy and that recessed portions were formed (between adjacent two of crystal grains of the copper-tin alloy) on the surface of the copper-tin alloy layer formed of the crystal grains of the copper-tin alloy, each of the recessed portions having a tin layer therein to allow the copper-tin alloy layer and the tin layers to exist on the outermost surface, and it was not confirmed that a plurality of copper-nickel-tin alloy layers of a copper-nickel-tin alloy existed so as to be apart from each other on the underlying side (on the side of an underlying layer) in the copper-tin alloy layer. The average thickness of the tin layers was 0.07 micrometers, and the average thickness of the copper-tin alloy layer was 0.92 micrometers. The underlying layer was formed of nickel, and no copper layer existed as the intermediate layer, so that the outermost layer was formed on the surface of the underlying layer. The average thickness of the underlying layer was 0.07 micrometers. The arithmetic mean waviness Wa was 0.13 micrometers after the tin layers were removed.

The area occupied by the tin layers on the outermost surface (the area ratio of tin) was 18.4%, the maximum depth in the recessed portions (the maximum thickness of the tin layers) was 0.95 micrometers, and the average distance between the recessed portions on the outermost surface was 4.18 micrometers. Furthermore, the ratio (a/b) of the maximum depth (a) of the recessed portions (the maximum thickness of the tin layers) to the average distance (b) between the recessed portions on the outermost surface was calculated to be 0.23.

The coefficient of dynamic friction was 0.38, 0.29 and 0.20 when the load was 2 N, 5 N and 8 N, respectively.

The producing conditions and characteristics of the tin-plated products in these Examples and Comparative Examples are shown in Tables 1 through 4.

TABLE 1

| | Substrate | | | Thickness of Plating Film (μm) | | | Ratio of Thickness of Plating Film |
|---|---|---|---|---|---|---|---|
| | Waviness Wa (μm) | Roughness Ra (μm) | Roughness Rz (μm) | Sn | Cu | Ni | |
| Ex. 1 | 0.03 | 0.06 | 0.50 | 0.45 | 0.28 | 0.08 | Sn/Cu = 1.6<br>Sn/(Cu + Ni) = 1.3 |
| Ex. 2 | 0.03 | 0.06 | 0.50 | 0.57 | 0.31 | 0.09 | Sn/Cu = 1.8<br>Sn/(Cu + Ni) = 1.4 |
| Ex. 3 | 0.03 | 0.06 | 0.50 | 0.70 | 0.45 | 0.09 | Sn/Cu = 1.6<br>Sn/(Cu + Ni) = 1.3 |
| Ex. 4 | 0.04 | 0.07 | 0.53 | 0.38 | 0.29 | 0.11 | Sn/Cu = 1.3<br>Sn/(Cu + Ni) = 1.0 |
| Comp. 1 | 0.08 | 0.15 | 1.65 | 1.00 | 0.00 | 0.00 | — |
| Comp. 2 | 0.03 | 0.06 | 0.50 | 0.95 | 0.49 | 0.09 | Sn/Cu = 1.9<br>Sn/(Cu + Ni) = 1.6 |
| Comp. 3 | 0.08 | 0.09 | 0.66 | 0.70 | 0.30 | 0.30 | Sn/Cu = 2.3<br>Sn/(Cu + Ni) = 1.2 |
| Comp. 4 | 0.08 | 0.13 | 0.86 | 0.56 | 0.29 | 0.09 | Sn/Cu = 1.9<br>Sn/(Cu + Ni) = 1.5 |

TABLE 2

| | Heat Treatment | |
|---|---|---|
| | Internal Temperature of Furnace (° C.) | Holding Time (s) |
| Ex. 1 | 700 | 5.0 |
| Ex. 2 | 700 | 5.0 |
| Ex. 3 | 700 | 4.7 |
| Ex. 4 | 700 | 6.8 |
| Comp. 1 | 650 | 4.3 |
| Comp. 2 | 700 | 4.7 |
| Comp. 3 | 650 | 4.0 |
| Comp. 4 | 700 | 6.0 |

TABLE 3

| | Outermost Layer | | Thickness (μm) | | | Waviness |
|---|---|---|---|---|---|---|
| | Structure of Outermost Surface | Cu—Ni—Sn alloy | Sn | Cu—Sn alloy | Ni or Cu—Ni alloy | Wa after removing Sn layer (μm) |
| Ex. 1 | Sn + Cu—Sn alloy | Presence | 0.04 | 0.87 | 0.06 | 0.05 |
| Ex. 2 | Sn + Cu—Sn alloy | Presence | 0.07 | 0.85 | 0.07 | 0.05 |
| Ex. 3 | Sn + Cu—Sn alloy | Presence | 0.07 | 1.26 | 0.05 | 0.03 |
| Ex. 4 | Sn + Cu—Sn alloy | Presence | 0.04 | 0.75 | 0.07 | 0.05 |
| Comp. 1 | Sn | Absence | 0.67 | 1.15 | 0.0 | 0.13 |
| Comp. 2 | Sn + Cu—Sn alloy | Presence | 0.23 | 1.27 | 0.06 | 0.03 |
| Comp. 3 | Sn | Presence | 0.34 | 0.77 | 0.30 | 0.08 |
| Comp. 4 | Sn + Cu—Sn alloy | Absence | 0.07 | 0.92 | 0.07 | 0.13 |

TABLE 4

| | Sn layer | | Average Distance between Recessed Portions | | Coefficient of Friction | | |
|---|---|---|---|---|---|---|---|
| | Area Ratio of Sn (%) | Maximum Thickness a (μm) | b (μm) | a/b | 2N | 5N | 8N |
| Ex. 1 | 20.8 | 0.38 | 1.35 | 0.28 | 0.33 | 0.26 | 0.18 |
| Ex. 2 | 18.0 | 0.51 | 2.10 | 0.24 | 0.28 | 0.22 | 0.15 |
| Ex. 3 | 42.9 | 1.00 | 1.33 | 0.75 | 0.33 | 0.25 | 0.18 |
| Ex. 4 | 16.3 | 0.52 | 2.38 | 0.22 | 0.17 | 0.13 | 0.10 |
| Comp. 1 | 100 | — | — | — | 0.44 | 0.35 | 0.23 |
| Comp. 2 | 73.8 | 3.15 | 1.34 | 2.35 | 0.43 | 0.30 | 0.20 |
| Comp. 3 | 100 | — | — | — | 0.42 | 0.32 | 0.22 |
| Comp. 4 | 18.4 | 0.95 | 4.18 | 0.23 | 0.38 | 0.29 | 0.20 |

Example 5

The same female terminal as that in Example 1 was prepared, and a plate test piece cut off from a heat-treated (reflowed) tin-plated product (a tin-plated product having a tin layer having a thickness of 0.34 micrometers as the outermost layer, the area ratio occupied by the tin layer on the outermost surface being 100%, and the tin-plated product having a nickel layer having a thickness of 0.3 micrometers as an underlying layer on a conductive substrate plate, and an intermediate layer of a copper-tin alloy and a copper-nickel-tin alloy having a thickness of 0.77 micrometers between the outermost layer and the underlying layer) was prepared as a male terminal, the heat-treated tin-plated product being obtained by forming a nickel plating layer having a thickness of 0.3 micrometers on the conductive substrate plate of a Cu—Ni—Sn—P alloy (a substrate of a copper alloy containing 1.0% by weight of nickel, 0.9% by weight of tin, 0.05% by weight of phosphorus and the balance being copper, and having an arithmetic mean roughness Ra of 0.09 micrometers, a maximum height Rz of 0.66 micrometers and an arithmetic mean waviness Wa of 0.08 micrometers) having a thickness of 0.2 mm, forming a copper plating layer having a thickness of 0.3 micrometers on the nickel plating layer, forming a tin plating layer having a thickness of 0.7 micrometers on the copper plating layer, and then, holding at 650° C. for 4 seconds. The female and male terminals thus prepared were used to calculate the coefficient of dynamic friction by the same method as that in Example 1. As a result, the coefficient of dynamic friction was 0.26, 0.14 and 0.14 when the load was 2 N, 5 N and 8 N, respectively.

Example 6

The same female terminal as that in Example 1 was prepared, and a plate test piece cut off from a heat-treated (reflowed) tin-plated product (a tin-plated product having a tin layer having a thickness of 0.98 micrometers as the outermost layer, the area ratio occupied by the tin layer on the outermost surface being 100%, and the tin-plated product having a copper-tin alloy layer having a thickness of 0.82 micrometers as an underlying layer on a conductive substrate plate) was prepared as a male terminal, the heat-treated tin-plated product being obtained by forming a copper plating layer having a thickness of 0.5 micrometers on the conductive substrate plate of C2680 alloy (brass) (a substrate of a copper alloy containing 65% by weight of copper and the balance being zinc, and having an arithmetic mean roughness Ra of 0.09 micrometers, a maximum height Rz of 0.73 micrometers and an arithmetic mean waviness Wa of 0.06 micrometers) having a thickness of 0.2 mm, forming a tin plating layer having a thickness of 1.2 micrometers on the copper plating layer, and then, holding at 650° C. for 4 seconds. The female and male terminals thus prepared were used to calculate the coefficient of dynamic friction by the same method as that in Example 1. As a result, the coefficient of dynamic friction was 0.34, 0.17 and 0.18 when the load was 2 N, 5 N and 8 N, respectively.

DESCRIPTION OF REFERENCE NUMBERS

10 Substrate
12 Underlying Layer
14 Outermost Layer
14a Copper-Tin Alloy Layer
14b Tin Layers
14c Copper-Nickel-Tin Alloy Layers

The invention claimed is:

1. A tin-plated product comprising:
    a substrate of copper or a copper alloy;
    an underlying layer of nickel or a copper-nickel alloy which is formed on a surface of the substrate; and
    an outermost layer containing tin, the outermost layer being formed on a surface of the underlying layer,
    wherein the outermost layer is composed of a copper-tin alloy layer of a copper-tin alloy, tin layers of tin, and copper-nickel-tin alloy layers of a copper-nickel-tin alloy, each of the tin layers being formed in a corresponding one of recessed portions on an outermost surface of the copper-tin alloy layer, the copper-nickel-tin alloy layers being arranged on the side of the underlying layer in the copper-tin alloy layer, the tin layers having an average thickness of 0.01 to 0.20 micrometers.

2. A tin-plated product as set forth in claim 1, wherein said copper-tin alloy layer is formed of crystal grains of the copper-tin alloy, and each of said recessed portions is formed between adjacent two of said crystal grains of the copper-tin alloy on said outermost surface.

3. A tin-plated product as set forth in claim 1, wherein said copper-nickel-tin alloy layers are composed of a plurality of layers which are arranged so as to be apart from each other.

4. A tin-plated product as set forth in claim 1, wherein an area ratio occupied by said tin layers on the outermost surface of the tin-plated product is 10 to 80%.

5. A tin-plated product as set forth in claim 1, wherein said tin layers have a maximum thickness of 1.5 micrometers or less.

6. A tin-plated product as set forth in claim 1, wherein said copper-tin alloy layer has an average thickness of 0.5 to 1.5 micrometers.

7. A tin-plated product as set forth in claim 1, wherein said underlying layer has an average thickness of 0.05 to 0.5 micrometers.

8. A tin-plated product as set forth in claim 1, wherein said outermost surface has an arithmetic mean waviness Wa of 0.06 micrometers or less in such a state that said tin layers are removed.

9. An electrical element which uses a tin-plated product as set forth in claim 1, as a material thereof.

10. A tin-plated product as set forth in claim 1, wherein the copper-nickel-tin alloy layers are composed of a plurality of layers which are arranged so as to be apart from each other.

* * * * *